Aug. 30, 1927.
A. O. KOPPIN
1,641,038
ROD CLAMP AND CLEVIS
Filed Jan. 30, 1923
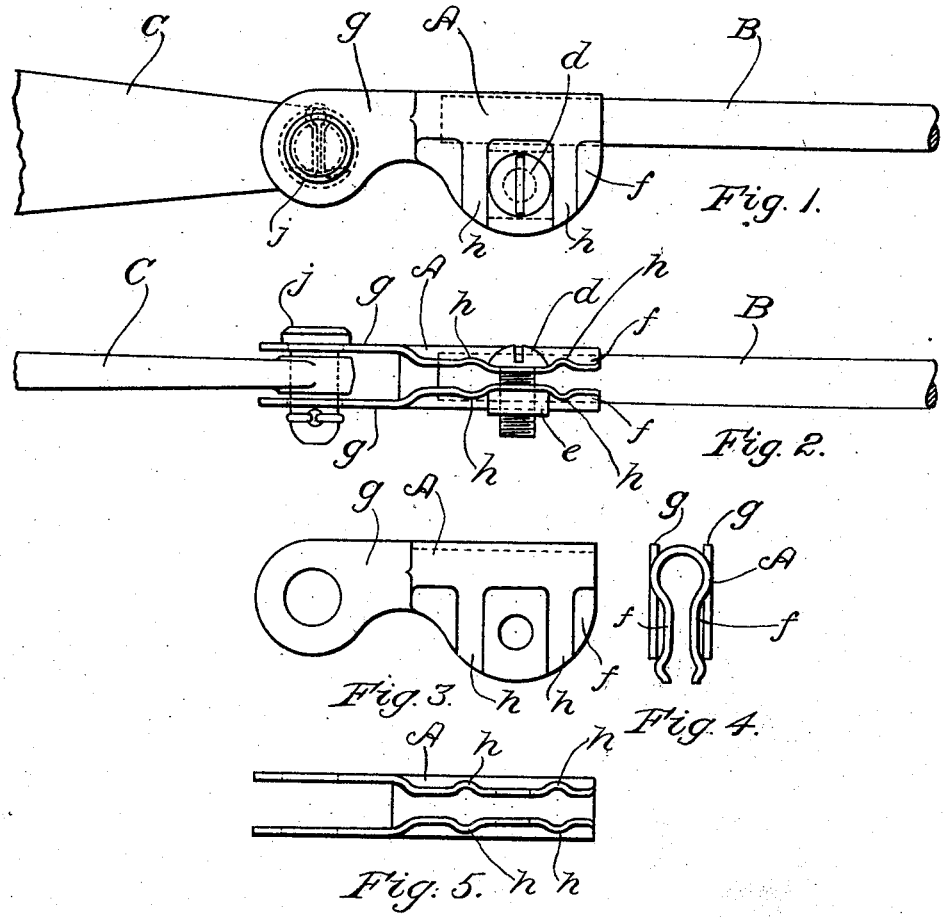
Inventor:
Alfred O. Koppin.

Patented Aug. 30, 1927.

1,641,038

UNITED STATES PATENT OFFICE.

ALFRED O. KOPPIN, OF DETROIT, MICHIGAN, ASSIGNOR TO HUDSON MOTOR CAR COMPANY, OF DETROIT, MICHIGAN, A CORPORATION OF MICHIGAN.

ROD CLAMP AND CLEVIS.

Application filed January 30, 1923. Serial No. 615,966.

The subject matter of my invention is a new and useful unitary construction of a rod clamp and clevis, especially adapted for use in connection with motor vehicles.

My invention has for its object to provide a convenient and satisfactory means for connecting control rods used on motor vehicles for various purposes, as, for example, for operating the throttle or spark-controller, or the throttle valve of systems which heat the body of a closed car from the exhaust of the engine.

The foregoing objects of the invention, together with means whereby the same may be carried into effect, will best be understood from the following description taken in connection with the accompanying drawings, in which:

Fig. 1 is a side elevation of my clamp and clevis construction, showing at one end a rod clamped in the clamp portion of the device and at the other end the clevis with a lever attached thereto.

Fig. 2 is a bottom plan view of the construction shown in Fig. 1.

Fig. 3 is an enlarged side elevation of the construction shown in Fig. 1 with the rod and lever removed.

Fig. 4 is an end view and Fig. 5 a bottom plan view of the construction shown in Fig. 3.

The combination clamp and clevis illustrated by Figures 1 to 5 is formed of a single piece of sheet metal stamped in part into tubular shape. The clamp portion A is adapted to receive a rod B and is further provided with a pair of laterally projecting ears $f$. The ears $f$ has registering holes for receiving a pinch bolt $d$. Each ear $f$ has two raised portions, or ribs $h$, so positioned on the ears as to prevent the nut $e$ on the bolt $d$ from turning with respect to the clamp portion when the bolt $d$ is tightened. The ribs $h$ also serve to strengthen the metal of the ears. My clamp and clevis construction is provided at the other end with two projecting members $g$ forming a clevis. The members $g$ have registering holes for receiving a bolt or pin $j$, thus providing a means of attaching a lever or other member C to the clevis.

In Figures 3, 4 and 5 the clamp and clevis construction is shown in detail with the rod and lever or the other member removed.

I do not wish to limit myself to the exact construction described, it being obvious that my invention may be varied in shape to conform with the requirements of a particular use. For example, the clamping portion may be formed so as to receive rods of different cross-sections and the ears and clevis members may also be varied in size or shape.

Having thus described my invention what I claim as new and desire to secure by Letters Patent is:

A unitary clamp and clevis constructed of sheet metal stamped into the desired shape, having at one end a pair of projecting members forming a clevis and at the other a pair of ears for tightening said clamp, each of said ears being provided with parallel ribs forming therebetween depressions, the spaces between said ribs being provided with aligned apertures, and a pinch bolt extending through said apertures for compressing the ears, the head of the bolt and the nut thereon being positioned in the depressions between the ribs whereby the nut will engage the ribs to prevent rotation of it relative to the bolt.

In testimony whereof I affix my signature.

ALFRED O. KOPPIN.